United States Patent [19]

Stewart et al.

[11] Patent Number: 5,518,920
[45] Date of Patent: May 21, 1996

[54] BIOLOGICAL TREATMENT OF HAZARDOUS WASTE

[75] Inventors: William C. Stewart, Gladstone; Randall R. Thom, Tualatin, both of Oreg.

[73] Assignee: Bio-Reaction Industries, Inc., Tualatin, Oreg.

[21] Appl. No.: 212,250

[22] Filed: Mar. 14, 1994

[51] Int. Cl.$^6$ .......................... B01D 53/34; C12M 1/20; C12M 1/14; B09B 3/00
[52] U.S. Cl. .................. 435/266; 435/286.1; 435/286.5; 435/289.1; 435/294.1; 435/295.1; 435/297.5; 55/494
[58] Field of Search .................. 435/266, 299, 435/300, 313, 301, 310, 289, 290, 291; 55/392, 393, 494, 525; 422/122, 184

[56] References Cited

U.S. PATENT DOCUMENTS

| | | | |
|---|---|---|---|
| H1,337 | 7/1994 | Hoeppel | 435/313 |
| 2,200,581 | 5/1940 | Prüss et al. | |
| 2,793,096 | 5/1957 | Pomeroy . | |
| 3,216,905 | 11/1965 | Baptist . | |
| 4,544,381 | 10/1985 | Schmidt | 55/89 |
| 4,662,900 | 5/1987 | Ottengraf | 55/90 |
| 4,806,148 | 2/1989 | Ottengraf | 55/84 |
| 4,894,162 | 1/1990 | Cournoyer et al. | 210/603 |
| 4,959,084 | 9/1990 | Wolverton et al. | 55/68 |
| 5,066,392 | 11/1991 | Kneer | 210/96.1 |
| 5,082,475 | 1/1992 | Bentz | 55/68 |
| 5,089,036 | 2/1992 | Hawes | 55/227 |
| 5,246,584 | 9/1993 | Donaldson et al. | 210/603 |

OTHER PUBLICATIONS

"BioFiltration Makes The Organics Go Down," *Chemical Engineering*, Apr. 1994, vol. 101, No. 4, p. 153.

*Primary Examiner*—Donald E. Czaja
*Assistant Examiner*—T. J. Reardon
*Attorney, Agent, or Firm*—Smith-Hill and Bedell

[57] ABSTRACT

Apparatus for treatment of material containing biodegradable volatile organic compounds in solid or liquid state, comprises a first chamber having a gas inlet and a gas outlet, the gas inlet being below the gas outlet. Material to be treated is supported in the first chamber between the gas inlet and the gas outlet. The material to be treated is warmed and an upward flow of air is established in the first chamber whereby biodegradable volatile organic compounds in the material are volatilized and become entrained in the upward flow of air. A second chamber has a gas inlet and a gas outlet, the gas inlet of the second chamber being below the gas outlet thereof. A duct delivers gas from the gas outlet of the first chamber to the gas inlet of the second chamber. A biologically active matrix including at least one organism that biologically converts the organic compounds to a nontoxic form is supported in the second chamber between the gas inlet and the gas outlet thereof.

18 Claims, 6 Drawing Sheets

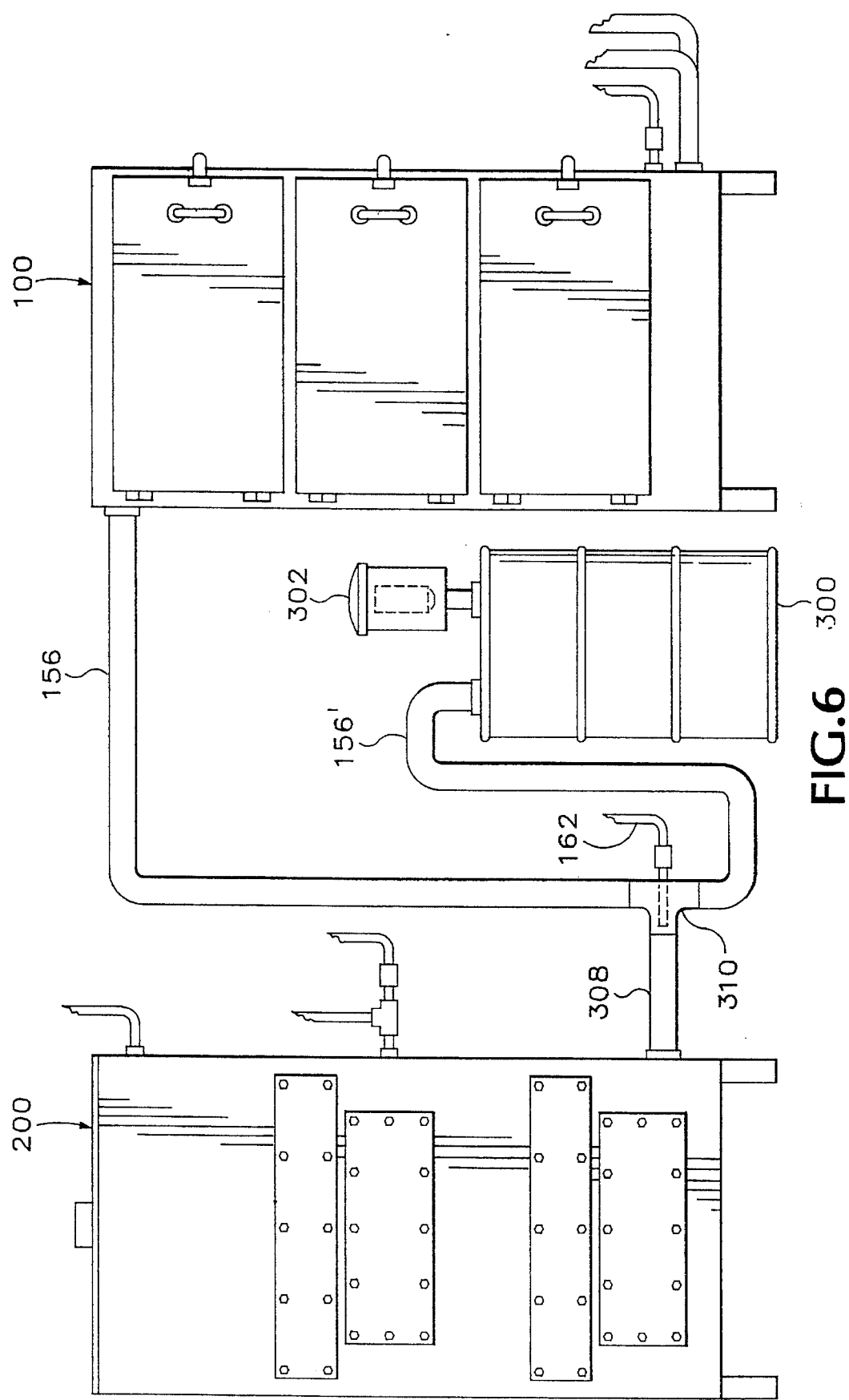

BIOLOGICAL TREATMENT OF HAZARDOUS WASTE

BACKGROUND OF THE INVENTION

This invention relates to the biological treatment of hazardous waste.

Volatile organic compounds (VOCs) of various kinds are widely used in many industrial processes. Typical VOCs include acetone, toluene, xylene, and methyl ethyl ketone (MEK). Disposal of VOCs or substances containing VOCs represents a significant problem for many industries.

Operation of a paint shop generates a large quantity of solvent-laden rags. In many cases, the solvents are VOCs, and the solvent absorbed in the rags is allowed to evaporate into the atmosphere. In some jurisdictions, paint shops operate under permits that limit the amount of their solvent emissions, and the solvent that evaporates from the rags counts toward that limit. Even if this were not the case, the solvent evaporation would be undesirable as contributing to atmospheric pollution.

A paint can containing unused paint is considered hazardous waste if the residue in the can is liquid. Often the residue is liquid due to the presence of VOCs. If the residue is solid, in most cases the can is no longer considered to be hazardous waste, and it is permissible to dispose of it in a landfill.

A still bottom (the residue remaining in a distillation vessel after useful fractions have been driven off) may contain VOCs. If the still bottom is solid, in most cases it can be disposed of in a landfill, but if it contains VOCs the still bottom must be treated as hazardous waste.

A known technique for solving the problem of paint cans and still bottoms is to allow any volatilizable compounds present in the residue to evaporate at ambient temperature into an effectively unconfined space. Since the VOCs evaporate at a fairly slow rate, and the space into which the VOCs evaporate is effectively unconfined, the concentration of VOCs in the atmosphere in the vicinity of the residue does not normally become bothersome, but this practice nevertheless contributes to atmospheric pollution.

Disposal of used aerosol cans also presents a problem of atmospheric pollution. Generally, the cans contain VOCs as propellant. If a can is discarded, there is a significant possibility that the can will eventually lose its integrity and the VOCs present in the can will escape into the atmosphere.

Compost comprises dead organic material and various microorganisms. The organic material may be a mixture of various types of plant debris, such as leaves, grass, and wood. A plant compost is a complex mixture of solids, some of which have decayed fully while others are in various stages of decay. The organic material provides attachment sites for the microorganisms that are present in the compost and also serves as a source of nutrients, particularly micronutrients such as nitrogen, phosphorus, potassium, and minerals. Some of the microorganisms that are present in compost can use certain VOCs as nutrients and convert them, in the presence of oxygen, into carbon dioxide and water.

A compost may be characterized by its maturity. A fresh, or immature, compost, for example containing fresh grass clippings, newly fallen leaves and new wood chips, contains a relatively small population of microorganisms. The microorganisms extract nutrients from the compost, and this causes the compost to decay. As the population and variety of microorganisms increases, both through addition of airborne microorganisms and through multiplication of microorganisms that are already present, the decay process accelerates and the compost matures. When the compost is fairly young, the level of biological activity can be such that the compost spontaneously heats up to a significant extent and may destroy the microorganisms. When the compost is fully decayed, the microorganism population dies out and the compost can be used as a mulch, for example.

U.S. Pat. No. 4,544,381 discloses a method for treatment of oxygen-containing gases that are contaminated with biodegradable substances. The treatment is accomplished by bringing the gases into contact with an aqueous suspension of suitable microorganisms.

U.S. Pat. No. 4,662,900 and U.S. Pat. No. 4,806,148 each disclose a method for removal of malodorous and/or toxic components from waste gases by biological treatment. The gas stream is passed through a filter bed that contains an organic biologically active material.

U.S. Pat. No. 5,089,036 discloses an air scrubber that employs microorganisms for digesting organic pollutants produced by experiments conducted in a glove box. The glove box and the air scrubber are in a closed circuit.

U.S. Pat. No. 5,246,584 discloses a method for destroying organic contaminants in an aqueous liquid, particularly ground water. The organic contaminants are volatilized and the vapors are condensed and then processed in a bioreactor, in which microorganisms convert the organic contaminants into carbon dioxide, water, and hydrochloric acid.

SUMMARY OF THE INVENTION

According to a first aspect of the present invention there is provided apparatus for treatment of material containing biodegradable volatile organic compounds in solid or liquid state, comprising first chamber means defining a first chamber having a gas inlet and a gas outlet, the gas inlet being below the gas outlet, a support means in the first chamber between the gas inlet and the gas outlet thereof for supporting material to be treated, a volatilizing means for establishing an upward flow of air in the first chamber past the support means and for warming the material to be treated, whereby biodegradable volatile organic compounds in the material are volatilized and become entrained in the upward flow of air, a second chamber means defining a second chamber having a gas inlet and a gas outlet, the gas inlet of the second chamber being below the gas outlet thereof, a duct means for delivering gas from the gas outlet of the first chamber to the gas inlet of the second chamber, and a biologically active matrix supported in the second chamber between the gas inlet and the gas outlet thereof, the matrix including an organism that biologically converts said organic compounds to a non-toxic form.

According to a second aspect of the present invention there is provided a method for treatment of material containing biodegradable volatile organic compounds in solid or liquid state, comprising disposing material to be treated in a first chamber having a gas inlet and a gas outlet, the gas inlet being below the gas outlet, establishing an upward flow of air in the first chamber past the material to be treated and warming the material to be treated, whereby biodegradable volatile organic compounds in the material are volatilized and become entrained in the upward flow of air, disposing a biologically active matrix in a second chamber having a gas inlet and a gas outlet, the gas inlet of the second chamber being below the gas outlet thereof, and the matrix including an organism that biologically converts said organic compounds to a non-toxic form, and delivering gas from the gas outlet of the first chamber to the gas inlet of the second chamber, whereby an upward flow of gas is established in the second chamber and the volatilized organic compounds are brought into contact with the biologically active matrix.

According to a third aspect of the present invention there is provided apparatus for treatment of material containing a biodegradable organic compound in gaseous state, comprising a chamber means defining a chamber having a gas inlet and a gas outlet, the gas inlet being below the gas outlet, a blower means for supplying air under pressure to the gas inlet, a means for adding a biodegradable organic compound in gaseous state to the supply of air to the gas inlet, a heater means disposed in the chamber for warming gas flowing through the chamber from the gas inlet to the gas outlet, a biologically active matrix supported in the chamber between the gas inlet and the gas outlet thereof and above the heater means, the matrix including an organism that biologically converts said organic compound to a non-toxic form.

According to a fourth aspect of the present invention there is provided a method for treatment of a biodegradable organic compound in gaseous state, comprising entraining material to be treated in a flow of air, disposing a biologically active matrix in a chamber having a gas inlet and a gas outlet, the gas inlet of the chamber being below the gas outlet thereof, and the matrix including an organism that biologically converts said organic compound to a non-toxic form, delivering the flow of air to the gas inlet of the chamber, and warming the flow of air delivered to the gas inlet of the chamber, whereby an upward flow of warm air with a biodegradable organic compound entrained therein is established in the chamber and the organic compound is brought into contact with the biologically active matrix.

BRIEF DESCRIPTION OF THE DRAWINGS

For a better understanding of the invention, and to show how the same may be carried into effect, reference will now be made, by way of example, to the accompanying drawings, in which:

FIG. 6 is a general view of a third form of apparatus embodying the invention, comprising a shelf unit, a puncturing unit and a biological unit.

DETAILED DESCRIPTION

Figure 1:
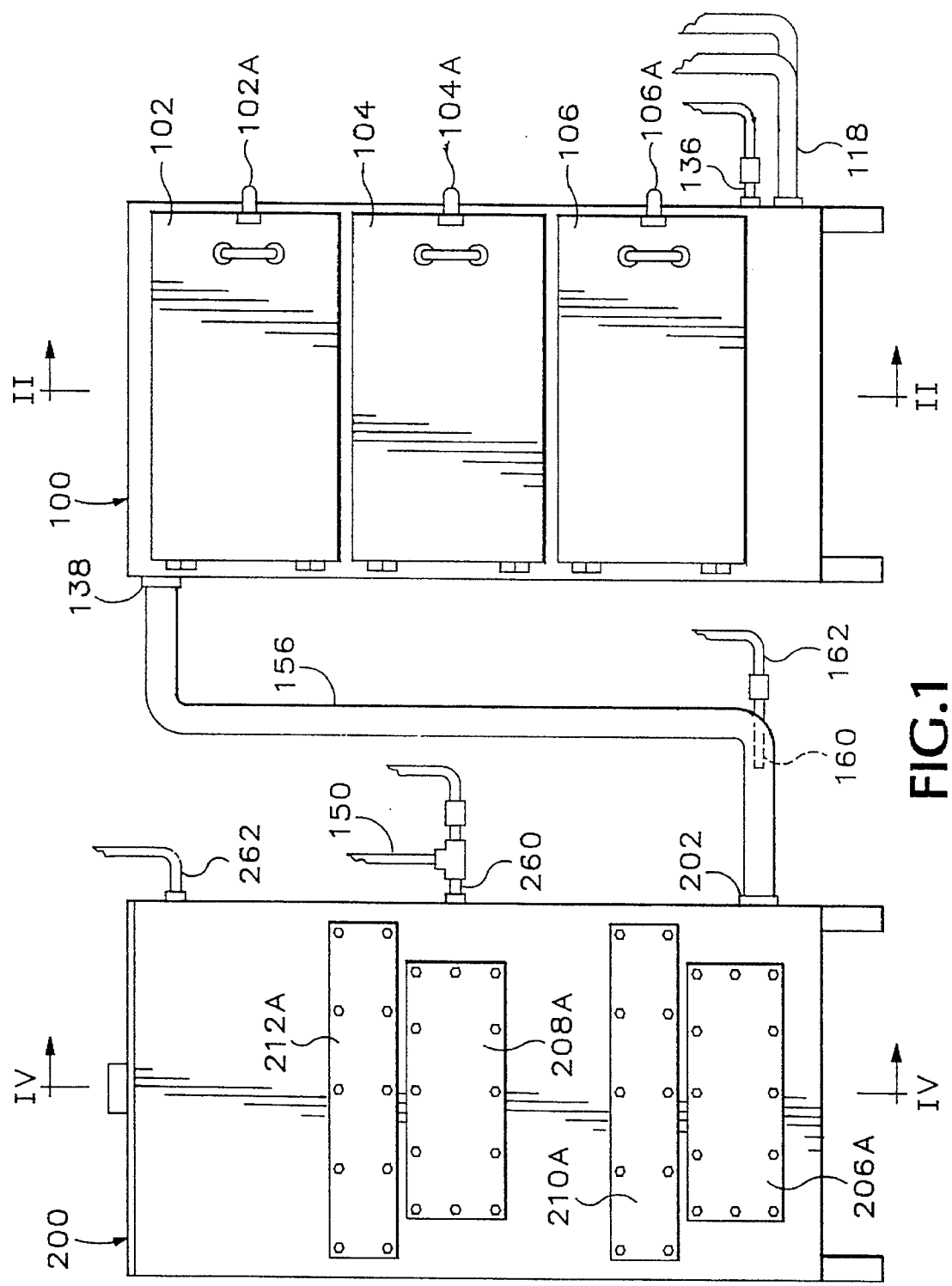
FIG. 1 is a general view of a first form of apparatus embodying the invention, comprising a shelf unit and a biological unit.
Figure 2:
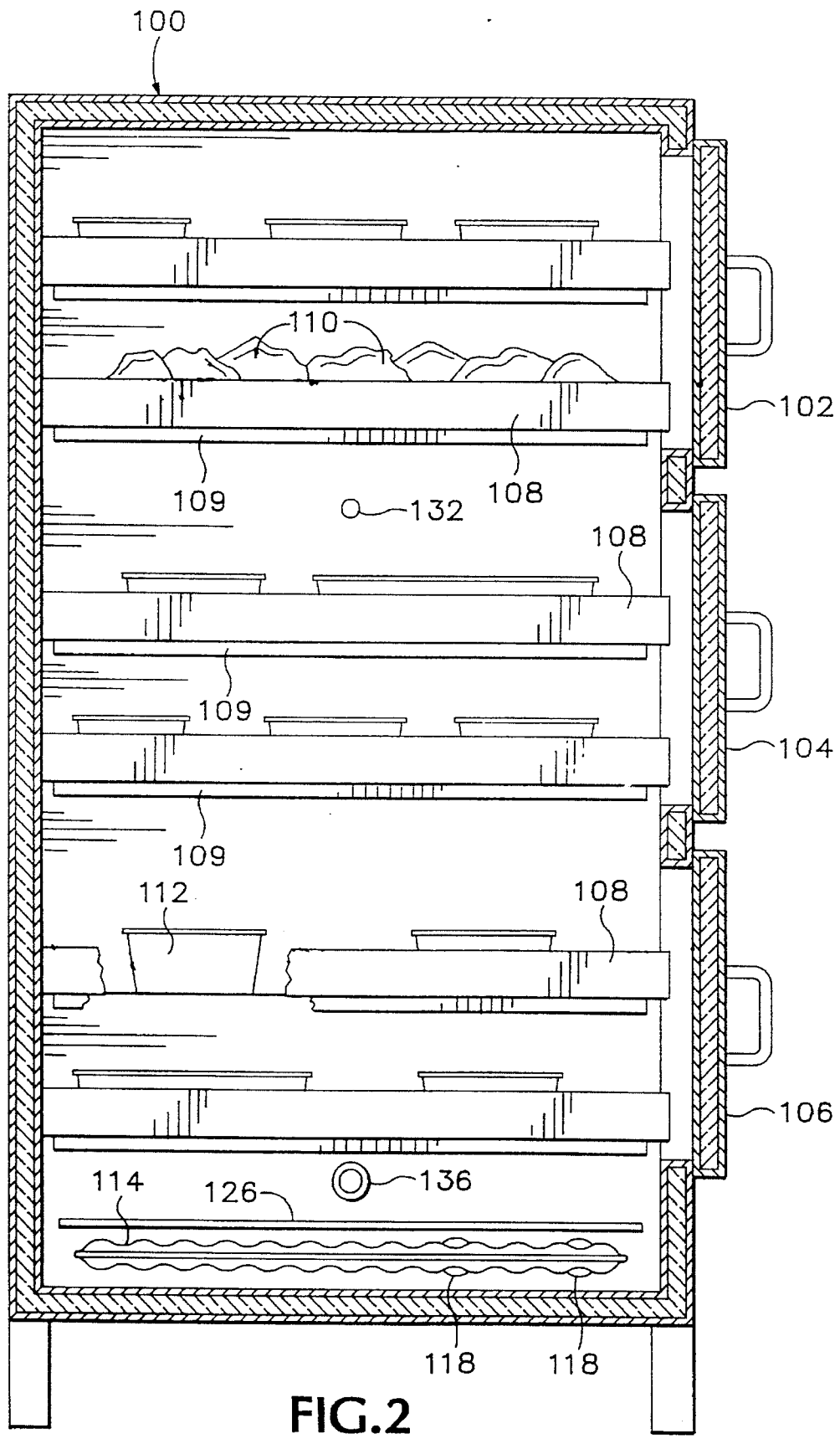
FIG. 2 is a sectional view of the shelf unit of the apparatus shown in FIG. 1, taken on the line II—II in FIG. 1.

The apparatus illustrated in FIGS. 1–4 of the drawings comprises two cabinets or containers 100 and 200. Preferably, the two cabinets are placed side-by-side on the same horizontal floor. The cabinet 100 is generally rectangular and has doors 102, 104, and 106, equipped with latches 102A–106A respectively, for providing access to the interior of the cabinet. The walls of the cabinet 100 and the doors 102–106 are thermally insulating in order to minimize loss of heat from the cabinet. Typically, thermal insulation is provided by constructing the walls and doors of the cabinet with double skins. Referring to FIG. 2; several vertically spaced trays 108 are supported inside the cabinet 100 on rails 109. The trays 108 are accessible from the exterior when the doors 102–106 are open. Articles containing VOCs to be treated are placed on the trays. These articles might include solvent laden rags 110 and cans 112 containing paint residue.

Figure 3:
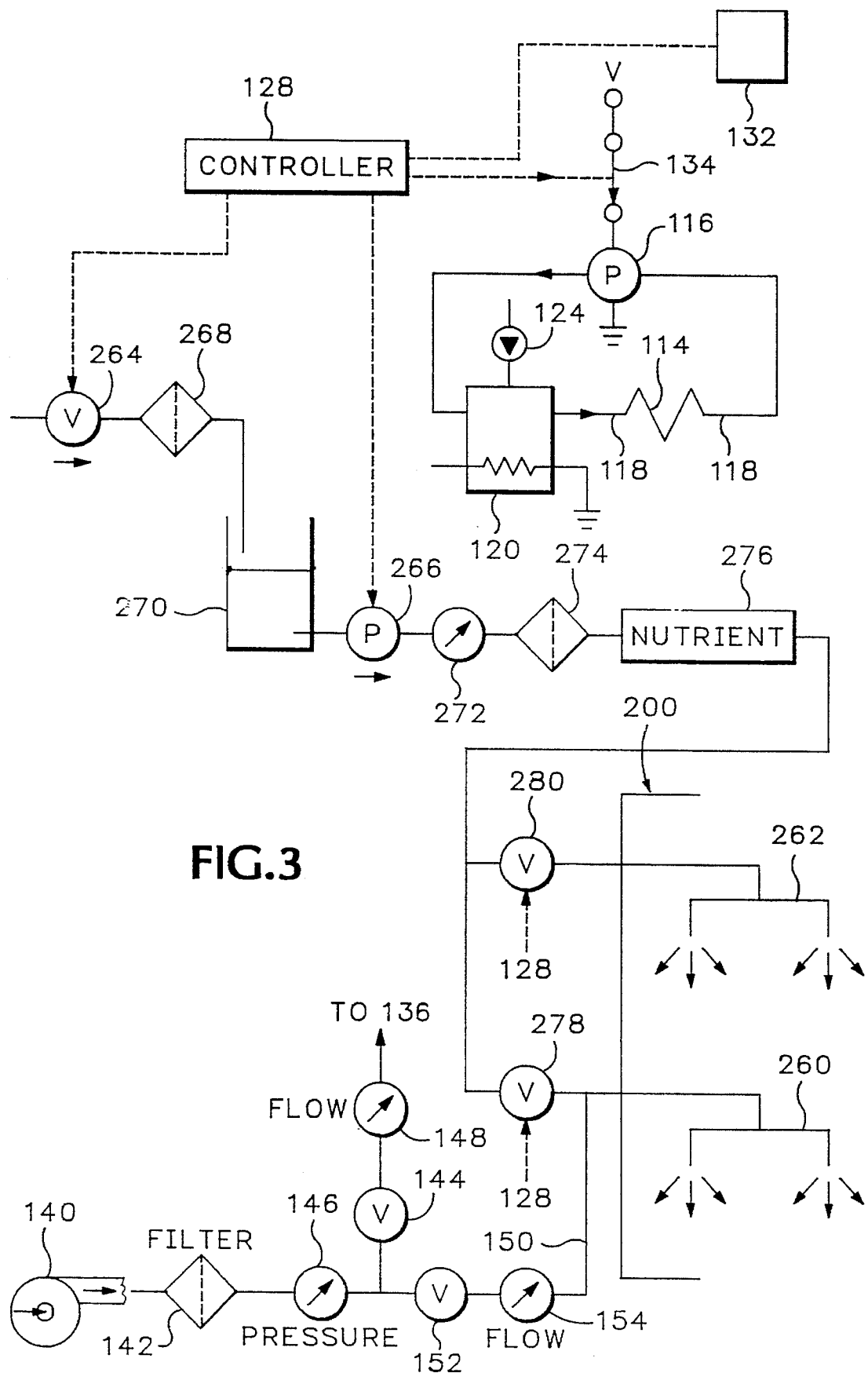
FIG. 3 is a schematic block diagram showing air, water and electrical paths used in the apparatus shown in FIG. 1.

Referring to FIGS. 1, 2, and 3, the cabinet 100 has a gas inlet 136 near the bottom and a gas outlet 138 near the top. The pressure side of an electrically-driven blower 140 is connected through a filter 142 and a solenoid valve 144 to the gas inlet 136. When the blower is in operation and the valve 144 is open, a flow of filtered air is driven through the cabinet from the inlet 136 to the outlet 138, passing over the trays 108. The pressure of the air flow is measured by a pressure gauge 146 and its flow rate is displayed by a flow meter 148. The blower also provides a secondary supply of air to a duct 150, by way of a solenoid valve 152 and a flowmeter 154, for a purpose that will be described below.

The cabinet 100 contains a double plate heat exchanger 114, which is located below the trays 108 and through which water is pumped in recirculating fashion by a pump 116 through couplings 118. The circuit through which the water circulates includes an electrically powered, thermostatically controlled water heater 120. A pressurized water supply is connected to the water heater through a check valve 124, for replenishing the water heater. Thus, when the pump 116 is in operation, warm water is circulated through the heat exchanger. A baffle plate 126 over the heat exchanger 114 is heated by radiation from the heat exchanger and protects the heat exchanger from damage in the event that an article falls from one of the trays 108. The air flowing into the cabinet 100 is warmed as it flows over the baffle plate 126.

The pump 116 is thermostatically controlled by a controller 128 in response to temperature sensed by a sensor 132 disposed in the cabinet 100. Thus, if the temperature in the cabinet 100 falls below a desired range, the controller 128 closes (renders conductive) a switch 134 that is connected between the pump 116 and its power supply, so that the pump operates to circulate water through the heat exchanger and supply heat to the interior of the cabinet 100. When the temperature sensed by the sensor 132 exceeds the desired operating range, the controller 128 opens (renders non-conductive) the switch 134 and circulation of water stops.

Figure 4:
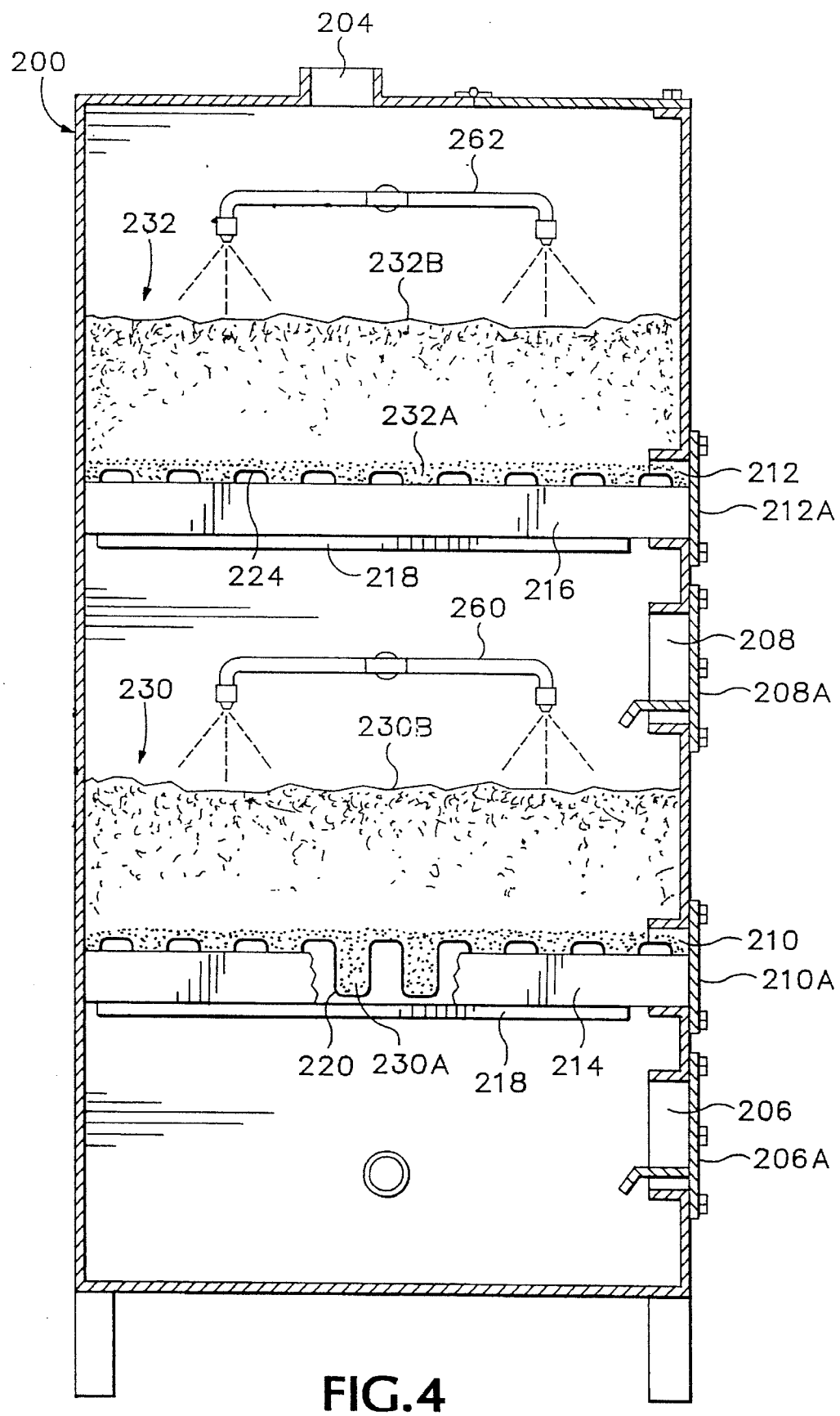
FIG. 4 is a sectional view of the biological unit shown in FIG. 1, taken on the line IV—IV in FIG. 1.

Referring to FIGS. 1 and 4, the cabinet 200 also is generally rectangular. The cabinet 200 has a gas inlet 202 near the bottom and a gas outlet 204 at the top. The gas outlet 138 of the cabinet 100 is connected by a duct 156 to the gas inlet 202 of the cabinet 200. Consequently, gas leaving the cabinet 100 by way of the outlet 138 is delivered to the cabinet 200 by way of its gas inlet 202, flows upwardly through the interior of the cabinet 200, and is discharged from the cabinet 200 by way of its gas outlet 204.

The front wall of the cabinet 200 is formed with access ports 206–212 that are provided with respective removable closure plates 206A–212A. The port 206 is near the bottom of the cabinet 200 and the port 208 is about half way up the cabinet. The ports 210 and 212 are just above the ports 206 and 208 respectively. The closure plates 206A and 208A are provided with drip lips in order to ensure that water dripping down inside the cabinet will not leak out between the closure plate 206A or 208A and the front wall of the cabinet. The walls of the cabinet 200 and the plates 206A–212A are not made of a thermally insulating material, because it is necessary to guard against overheating of the cabinet.

Inside the cabinet 200 are two trays 214 and 216, resting on rails 218 in a generally horizontal orientation. The trays 214, 216 are removable from the cabinet by way of the ports 210, 212 respectively. Two open mesh screens 220, 224 are supported in the trays 214, 216 respectively. The underside of the screen 220 is visible through the port 206 whereas the underside of the screen 224 is visible through the port 208. Porous biologically active filters 230 and 232 are supported on the screens 220 and 224 respectively.

Each of the filters comprises a biologically active matrix, or biomatrix, containing plant compost and other ingredients as explained below. The compost contains bacteria, including microorganisms that have an affinity for VOCs and consume VOCs as nutrients. The biomatrix fills the cabinet 200 to a height of about 12 inches above the screen 220 and to a height of about 4 inches above the screen 224.

Spray tubes 260 and 262 are mounted inside the cabinet 200 above the filters 228 and 232 respectively. Referring to FIG. 3, a solenoid valve 264, operating in response to the controller 128, supplies water through a reverse osmosis filter 268 to a tank 270 that is equipped with level detectors (not shown). The level detectors supply signals to the controller, which controls the valve 264 so as to maintain the water level in the tank within a desired range. A watering pump 266, operating in response to a timer included in the controller 128, extracts filtered and demineralized water from the tank 270 and delivers it by way of a pressure gauge 272, a mechanical filter 274, a nutrient addition cell 276 containing a water-soluble fertilizer, and two solenoid valves 278, 280 to the spray tubes 260 and 262 respectively. The spray tubes are provided with nozzles for spraying the water uniformly over the filters 230, 232. The controller includes a second timer (not shown) for controlling operation of the watering pump 266 and solenoid valves 278, 280. From time to time, the second timer operates the pump 266 and opens the valves 278, 280 and the filtered and demineralized water, with micronutrients and/or pH buffering material added by the cell 276, is supplied to the spray tubes 260 and 262.

The secondary air supply duct 150 is connected to the spray tube 260 for introducing additional air into the cabinet 200, above the filter 230, on a cycle that is offset from the cycle for supply of water to the spray nozzles.

In use of the apparatus shown in FIG. 1, objects containing biodegradable VOCs in the liquid state, such as solvent-laden rags, still bottoms, and cans containing unused paint, are placed in the trays in the cabinet 100. The operation of the water heater 120 and associated components results in the objects being warmed above ambient temperature, preferably to a temperature of about 43° C. The elevated temperature increases the vapor pressure of the VOCs and the combination of increased vapor pressure and air movement drives the VOCs from the objects being treated, so that VOCs evaporate and are entrained in the flow of air from the cabinet 100. Because the cabinet 100 is quite small and the objects are warmed above ambient temperature and the flow of air is not rapid, the concentration of VOCs in the air leaving the cabinet 100 is quite high.

The VOC-laden air is delivered to the cabinet 200 and flows upwardly from the gas inlet 202 through the porous filters 228 and 230. The VOCs are chemically absorbed by the microorganisms that are present in the biomatrix and are thereby removed from the upflowing gas stream. The microorganisms convert the VOCs aerobically to carbon dioxide and water. The action of the filter 228 is a coarse action, removing the greater proportion of the VOCs, whereas the filter 230 serves a polishing purpose, removing only a relatively small proportion of the VOCs but ensuring that the gas leaving the chamber 200 is virtually free of VOCs.

The air supply duct 156 leading to the cabinet 200 is provided with a venturi nozzle 160. The flow of air through the venturi nozzle creates a low pressure in the pipe 162, which is connected to a remote source of VOCs. In this manner, VOCs from the remote source are inducted into the cabinet 200 for treatment.

The level of metabolic action in the biomatrix results in heating of the matrix, and so water present in the matrix tends to evaporate. The rate of evaporation may exceed the rate of production of water by the activity of the microorganisms, so that there is a danger that the matrix will dry out, which is undesirable. The action of the spray tubes is conjunction with the controller 128 ensures that the biomatrix remains moist and that the supply of micronutrients is replenished.

The metabolic activity in the filter 228 results in the gas leaving the filter having a rather low oxygen concentration. The secondary air supply ensures that the polishing filter 230 is not starved of oxygen by the primary filter and the metabolic rate of the microorganisms in the polishing filter remains sufficiently high.

The compost that is employed in the apparatus shown in FIG. 1 preferably contains a fairly high proportion of wood debris, and may also comprise additional wood that has not yet decayed. The compost may also contain other organic material, such as farm manure, and inert material such as perlite for added porosity so that the filters present minimum back pressure to the flow of gas into the cabinet 200. Preferably, the compost is fairly mature. If the compost is immature, it heats up excessively, having a deleterious effect on the microorganisms that are present. If the compost is too mature, its rate of metabolic activity may be undesirably low.

The screens 220 and 224 may be made of stainless steel mesh having an aperture size of about one-half inch and are undulating in configuration, with a wavelength of about 3.5 inch and an amplitude of about 2.5 inch. The undulating configuration of the screens is chosen in order that the filters should present a large surface area to the upflowing stream of VOC-laden air. As shown in FIG. 4, the undulating configuration of the screens results in formation of discrete pockets that extend downward in the cabinet 200.

FIG. 5 shows a modified form of the apparatus, for treatment of aerosol cans. The apparatus shown in FIG. 5 does not include a shelf unit of the kind shown in FIG. 1. Instead, the connection duct 156' is connected to an expansion tank 300, which may comprise a conventional fifty gallon drum. The tank 300 is provided at the top with a mechanism 302 for puncturing aerosol cans. This mechanism 302 may be of conventional form. A can to be treated is placed in the mechanism 302 and the can is then punctured. The VOCs that are released when the can is punctured expand into the tank 300 and flow from the tank 300 into the cabinet 200' by way of the duct 156. The expansion tank ensures that the pressure wave that is created when the can is punctured is attenuated before it reaches the cabinet 200'.

When gas under pressure is released from an aerosol can, its temperature falls due to expansion. Therefore it is desirable to warm the gas entering the cabinet 200' in order to avoid thermal shock to the microorganisms. This is accomplished by providing a heat exchanger 114' in the bottom of the cabinet 200. As shown in FIG. 5A, the heat exchanger 114', which is connected in a thermostatically controlled heating circuit similar to that shown in FIG. 3, is essentially the same as the heat exchanger 114 shown in FIG. 2. The baffle plate 126' protects the heat exchanger 114' from water dripping from the filters.

Figure 5:
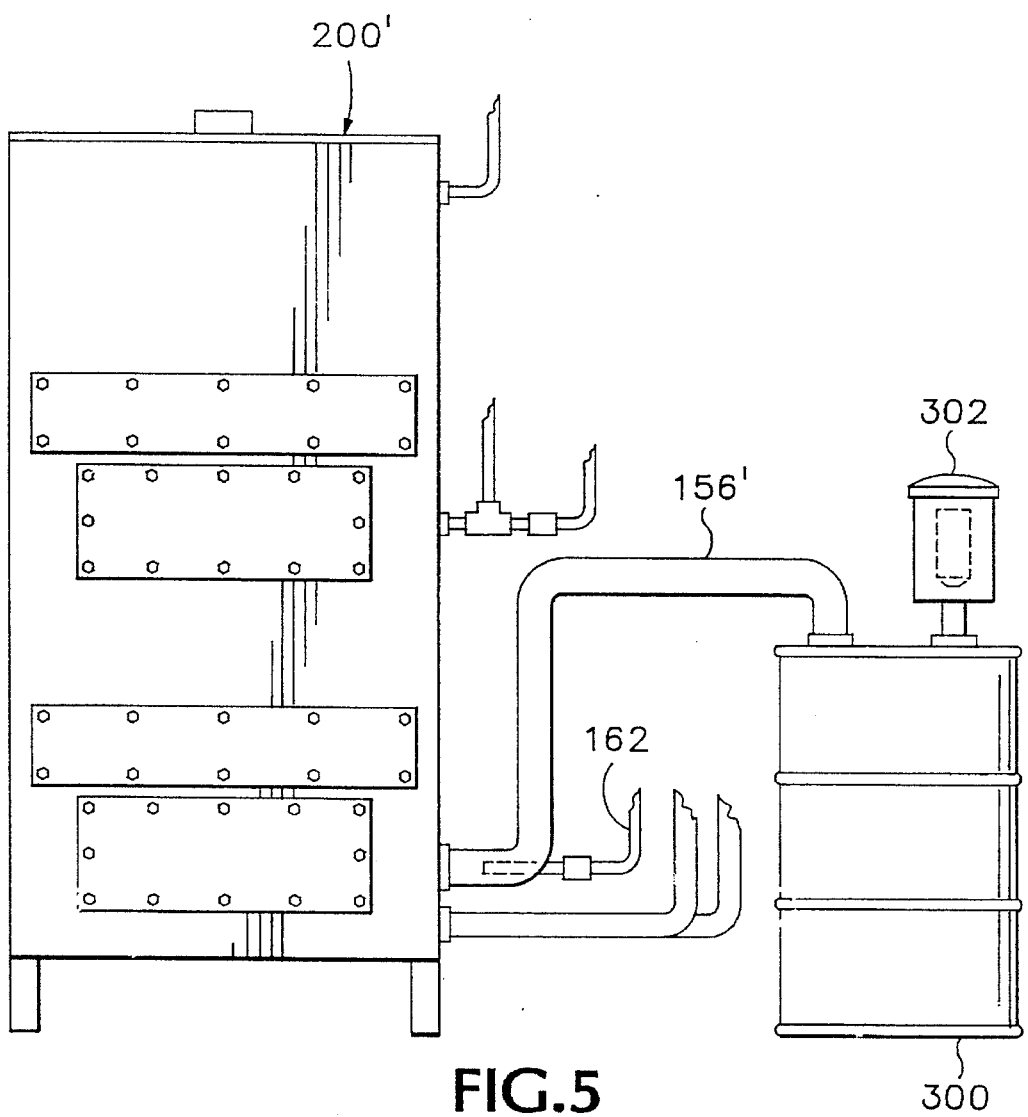
FIG. 5 is a general view of a second form of apparatus embodying the invention, comprising a puncturing unit and a biological unit.
Figure 5A:
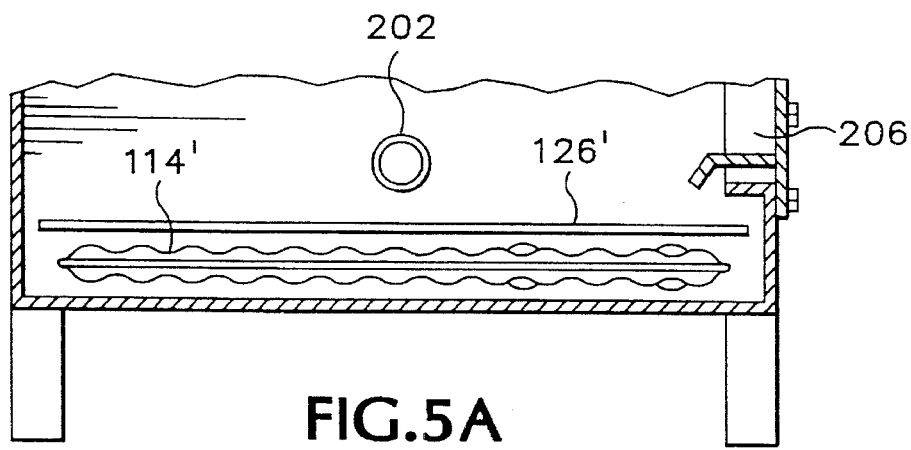
FIG. 5A is a partial sectional view of the biological unit shown in FIG. 5.

FIG. 6 shows an apparatus that is based on that shown in FIG. 1 but also includes some of the features of FIG. 5. As shown in FIG. 6, the duct 156' from the expansion tank 300 is connected to the duct 156 from the gas outlet of the cabinet 100 at a tee 310, and the tee 310 is connected to the gas inlet of the cabinet 200 by a duct 308. In the case of the apparatus shown in FIG. 6, it is not necessary to provide a heat exchanger inside the cabinet 200, because the warm air supplied from the cabinet 100 prevents the cool gases provided from the expansion tank from imparting a thermal shock to the microorganisms.

It has been found that most of the biological activity in each filter takes place in a fairly thin layer of biomatrix immediately above the screen at the bottom of the filter. Accordingly, it may be desirable to employ more than two filters in the cabinet 200, with the thicknesses of the respective layers of biomatrix selected so that there is a high level of biological activity in each filter. In this case it would probably be necessary to provide a secondary air inlet between each two filters in order to ensure that there is adequate oxygen for the upper filter of each pair of successive filters.

It will be appreciated that the invention is not restricted to the particular embodiments that have been described, and that variations may be made therein without departing from the scope of the invention as defined in the appended claims and equivalents thereof. For example, as noted above, the invention is not restricted to there being only two biologically active filters in the cabinet 200.

We claim:

1. An apparatus for treatment of material containing biodegradable volatile organic compounds in solid or liquid state, comprising:

a first chamber means defining a first chamber having a gas inlet and a gas outlet, the gas inlet being below the gas outlet, a support means in the first chamber between the gas inlet and the gas outlet thereof for supporting material to be treated, a volatilizing means for establishing an upward flow of air in the first chamber from the gas inlet of the first chamber past the support means and for warming the material to be treated, whereby biodegradable volatile organic compounds in the material are volatilized and become entrained in the upward flow of air, a second chamber means defining a second chamber having a gas inlet and a gas outlet, the gas inlet of the second chamber being below the gas outlet thereof, a duct means for delivering a gas flow from the gas outlet of the first chamber to the gas inlet of the second chamber, a biologically active matrix supported in the second chamber between the gas inlet and the gas outlet thereof, the matrix including at least one organism that biologically degrades said organic compounds, venturi means connected in the duct means, an auxiliary chamber connected to the venturi means, and a puncturing means in the auxiliary chamber for puncturing a pressurized container disposed in the auxiliary chamber, whereby gas released from the pressurized container is inducted into the gas flow from the gas outlet of the first chamber.

2. An apparatus for biologically degrading a biodegradable organic compound, comprising:

a biomatrix chamber means defining a biomatrix chamber having a gas inlet and a gas outlet, the gas inlet being below the gas outlet, a blower means for supplying air under pressure to the gas inlet, a means for adding a biodegradable organic compound in gaseous state to the supply of air to the gas inlet, a first porous support member disposed in the biomatrix chamber between the gas inlet and the gas outlet, a first biologically active matrix supported in the biomatrix chamber on the first porous support member, the first matrix including at least one organism that biologically degrades said organic compound, a first watering device for supplying water to the first biologically active matrix, a second porous support member disposed in the biomatrix chamber between the first porous support member and the gas outlet, the second porous support member being spaced from the first biologically active matrix, a second biologically active matrix supported in the biomatrix chamber on the second porous support member, the second matrix including at least one organism that biologically degrades said organic compound, a second watering device for supplying water to the second biologically active matrix, and an air inlet for introducing air into the biomatrix chamber between the first biologically active matrix and the second porous support member.

3. The apparatus according to claim 2, wherein said biodegradable organic compound is volatilizable and the means for adding a biodegradable organic compound in gaseous state to the supply of air to the gas inlet of the biomatrix chamber comprises:

a drying chamber means defining a drying chamber having a gas inlet and a gas outlet, the gas inlet of the drying chamber being below the gas outlet thereof and being connected to the blower means, at least one support tray between the gas inlet and the gas outlet of the drying chamber for supporting discrete objects having the volatilizable biodegradable organic compound present therein or thereon, a duct means connected between the gas outlet of the drying chamber and the gas inlet of the biomatrix chamber for delivering gas from the drying chamber to the biomatrix chamber, and a heater means disposed in the drying chamber below the support tray for supplying thermal energy to the drying chamber, whereby objects supported by the support tray are warmed and the volatilizable biodegradable organic compound present in or on such objects is volatilized, and air leaving the drying chamber by way of the gas outlet thereof is laden with the volatilized biodegradable organic compound and delivers the biodegradable organic compound to the biomatrix chamber, whereby the biodegradable organic compound is brought into contact with at least the first biologically active matrix and is biologically degraded.

4. The apparatus according to claim 3, comprising a controller means for controlling operation of the heater means.

5. The apparatus according to claim 3, wherein the heater means comprises a heat exchanger, and the apparatus further comprises a pump means for circulating water through the heat exchanger and a means for heating the water.

6. The apparatus according to claim 5, comprising a temperature sensor for sensing temperature in the drying chamber, and wherein the pump means is responsive to the temperature sensor for maintaining the temperature in the drying chamber within a suitable range.

7. The apparatus according to claim 2, comprising a nutrient means for supplying nutrient to at least one of the biologically active matrices.

8. The apparatus according to claim 2, wherein the first and second watering devices comprise respective nozzles for spraying water onto the first and second matrices respectively.

9. The apparatus according to claim 2, comprising an air supply means for supplying air to the air inlet, and a water supply means for supplying water to the watering devices.

10. The apparatus according to claim 9, comprising a controller means for controlling supply of water by the water supply means and supply of air by the air supply means.

11. The apparatus according to claim 2, comprising a duct means connected between the blower means and the gas inlet of the biomatrix chamber for delivering a gas flow from the blower means to the biomatrix chamber, venturi means connected in the duct means, an auxiliary chamber connected to the venturi means, and a puncturing means in the auxiliary chamber for puncturing a pressurized container disposed in the auxiliary chamber, whereby gas released from the pressurized container is inducted into the gas flow to the biomatrix chamber.

12. The apparatus according to claim 2, wherein at least one of the first and second porous support members comprises portions that define discrete pockets extending toward the gas inlet.

13. The apparatus according to claim 12, wherein each of the porous support members forms said discrete pockets, of mesh material, connected by substantially horizontal segments of mesh material.

14. A method for biologically degrading a biodegradable organic compound in gaseous state, comprising:

(a) providing an apparatus comprising a biomatrix chamber means defining a biomatrix chamber having a gas inlet and a gas outlet, the gas inlet being below the gas outlet, a first porous support member supported in the biomatrix chamber between the gas inlet and the gas outlet, a first biologically active matrix supported in the biomatrix chamber on the first porous support member, the first matrix including at least one organism that biologically degrades said organic compound, a second porous support member supported in the biomatrix chamber between the first porous support member and the gas outlet and spaced from the first biologically active matrix, and a second biologically active matrix supported in the biomatrix chamber on the second porous support member, the second matrix including at least one organism that biologically degrades said organic compound, (b) entraining a quantity of said biodegradable organic compound in a flow of air, (c) delivering the flow of air to the gas inlet of the biomatrix chamber, whereby an upward flow of the air with said organic compound entrained therein is established in the chamber and the organic compound is brought into contact with at least one of said biologically active matrices, and (d) at times and in amounts suitable for said at least one organism to biologically degrade said compound, supplying water to the first biologically active matrix, supplying water to the second biologically active matrix, and introducing air into the biomatrix chamber between the first biologically active matrix and the second porous support member.

15. The method according to claim 14, wherein said biodegradable organic compound is selected from the group that consists of acetone, toluene, xylene, and methyl ethyl ketone.

16. The method according to claim 14, wherein at least one of the first and second porous support members of the apparatus provided in step (a) comprises portions that define discrete pockets extending toward the gas inlet.

17. The method according to claim 16, wherein each of the porous support members forms said discrete pockets, of mesh material, connected by substantially horizontal segments of mesh material.

18. A method for biologically degrading a volatilizable biodegradable organic compound in gaseous state, comprising:

(a) providing an apparatus comprising a blower means for establishing a flow of air, a drying chamber means defining a drying chamber having a gas inlet and a gas outlet, the gas inlet of the drying chamber being below the gas outlet thereof and being connected to the blower means, at least one support tray between the gas inlet and the gas outlet of the drying chamber for supporting discrete objects, a heater means disposed in the drying chamber below the support tray for supplying thermal energy to the drying chamber, a biomatrix chamber means defining a biomatrix chamber having a gas inlet and a gas outlet, the gas inlet of the biomatrix chamber means being below the gas outlet thereof, a duct means connected between the gas outlet of the drying chamber and the gas inlet of the biomatrix chamber for delivering gas from the drying chamber to the biomatrix chamber, a first porous support member supported in the biomatrix chamber between the gas inlet and the gas outlet of the biomatrix chamber, a first biologically active matrix supported in the biomatrix chamber on the first porous support member, the first matrix including at least one organism that biologically degrades said organic compound, a second porous support member supported in the biomatrix chamber between the first porous support member and the gas outlet of the biomatrix chamber and spaced from the first biologically active matrix, and a second biologically active matrix supported in the biomatrix chamber on the second porous support member, the second matrix including at least one organism that biologically degrades said organic compound, (b) disposing an object having said biodegradable organic compound present therein or thereon on the support tray whereby the object is warmed by the thermal energy supplied to the drying chamber by the heater means, (c) operating the blower means to establish an upward flow of air in the drying chamber past the object, whereby a quantity of the biodegradable organic compound is volatilized and becomes entrained in the upward flow of air, (d) delivering the flow of air from the gas outlet of the drying chamber to the gas inlet of the biomatrix chamber by way of the duct means, whereby an upward flow of the air with the biodegradable organic compound entrained therein is established in the biomatrix chamber and the biodegradable organic compound is brought into contact with at least the first biologically active matrix, and (e) at times and in amounts suitable for said at least one organism to biologically degrade said compound, supplying water to the first biologically active matrix, supplying water to the second biologically active matrix, and introducing air into the biomatrix chamber between the first biologically active matrix and the second porous support member.

* * * * *